Aug. 8, 1944.  W. HOLINATY  2,355,295
TIRE PRESSURE INDICATOR
Filed Aug. 25, 1941  2 Sheets-Sheet 1
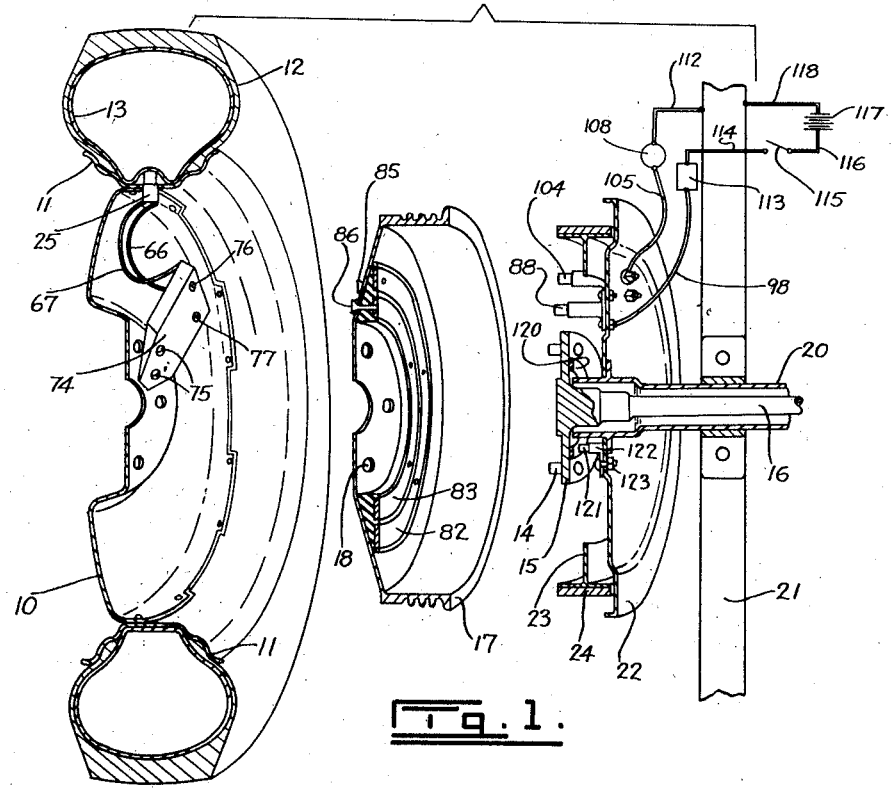
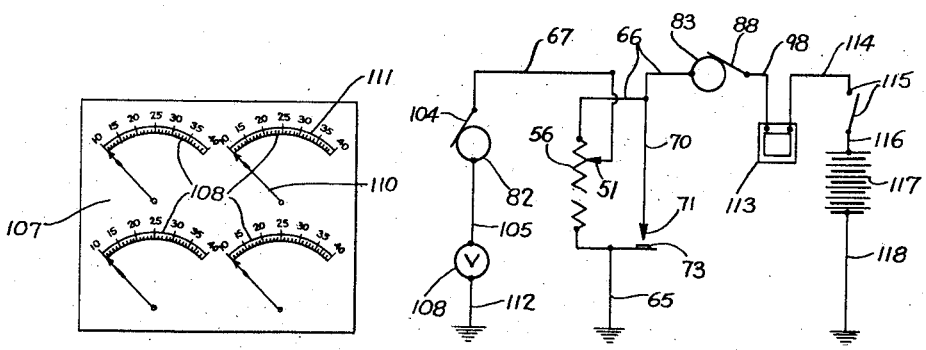
INVENTOR
William Holinaty
BY: Eugene E. Stevens
ATTORNEY Aug. 8, 1944. W. HOLINATY 2,355,295
TIRE PRESSURE INDICATOR
Filed Aug. 25, 1941 2 Sheets-Sheet 2

INVENTOR
William Holinaty
BY: Eugene E. Stevens
ATTORNEY

Patented Aug. 8, 1944

2,355,295

UNITED STATES PATENT OFFICE 2,355,295

TIRE PRESSURE INDICATOR

William Holinaty, New Westminster, British Columbia, Canada

Application August 25, 1941, Serial No. 408,269

6 Claims. (Cl. 201—48)

This invention relates to improvements in tire gauges.

An object of the present invention is the provision of tire gauge apparatus adapted to indicate on conveniently located dials the exact pressure of each pneumatic tire of a vehicle when its ignition switch is on regardless of whether the vehicle is stationary or in motion.

Another object is the provision of means for increasing the safety and economy of travel by instantly indicating to the operator of the vehicle that a tire is losing pressure and the rate of such loss.

Another object is the provision of means for audibly warning a vehicle operator that the pressure of a tire is outside a predetermined range.

A further object is the provision of a tire gauge which may be adjusted from time to time to ensure that it is registering accurately.

Figure 2:
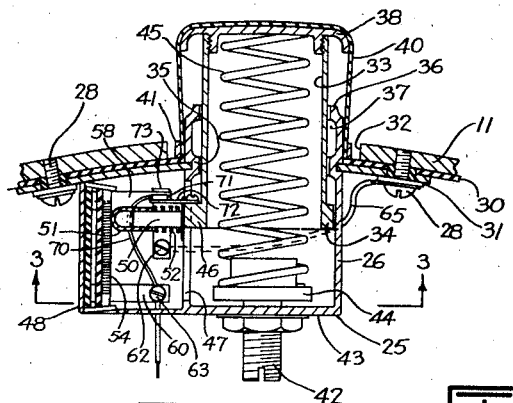
Figure 4:
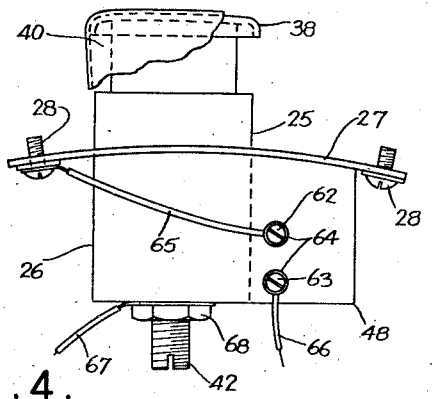
Figure 3:
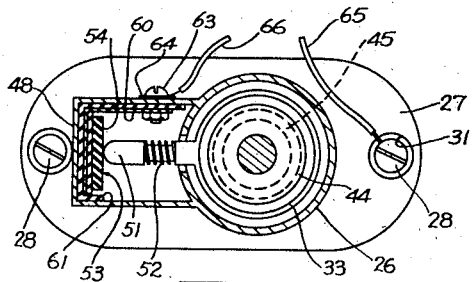
Figure 5:
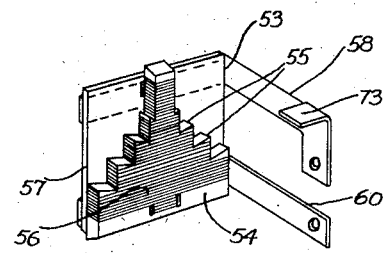
Figure 7:
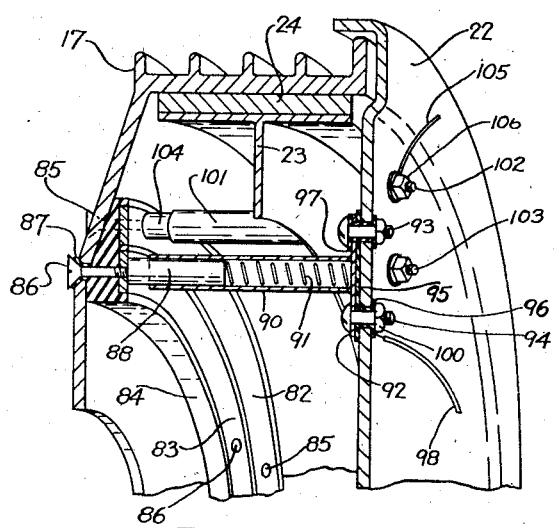
Figure 6:
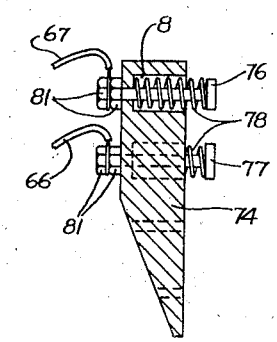

With these and other objects in view, the present invention consists essentially of tire gauge apparatus adapted to register the pressure of a pneumatic tire mounted on the rim of a vehicle wheel, comprising a housing mounted on the rim, a plunger mounted in the housing and projecting beyond the outer end thereof into the tire, spring means in the housing urging the plunger outwardly therefrom, said plunger being depressed against the pressure of the spring by the tube of the tire as the latter is inflated, means for adjusting the tension of the spring, a resistance coil mounted in a circuit including a battery, an arm projecting outwardly from the plunger, a contact on said arm adapted to engage and be moved up and down the coil by the plunger, and a meter mounted within the vehicle in a circuit which includes the contact, said meter being operated by the plunger accurately to indicate the pressure of the tire, as more fully described in the following specification and illustrated in the accompanying drawings, in which Figure 1 is a perspective view of half a wheel with the brake drum and brake flange plate spaced therefrom for the sake of clarity, illustrating the mounting of the tire gauge and with the wiring to the pressure indicator, the battery, etc., shown diagrammatically, Figure 2 is an enlarged sectional view of the rheostat assembly which is mounted on the rim of a wheel of the vehicle, Figure 3 is a cross section taken on line 3—3 of Figure 2, Figure 4 is a reduced side elevation of the rheostat assembly, Figure 5 is an enlarged perspective view of the resistance coil of the rheostat assembly, Figure 6 is a vertical section through a contact block which is mounted on the wheel, Figure 7 is an enlarged detail showing the electrical connection between the movable brake drum and the stationary brake flange plate, Figure 8 is a view of the indicator panel, and Figure 9 is a wiring diagram.

Referring more particularly to Figure 1 of the drawings which shows the usual mounting of an automobile wheel and its brake drum assembly, 10 is a vehicle wheel having a rim 11 upon which a tire casing 12 is mounted with its inner tube 13. The wheel 11 is adapted to be mounted on bolts 14 carried by a disc 15 mounted on the end of an axle 16 of the vehicle. A brake drum 17 is located between the wheel 11 and the disc 15, the bolts 14 extending through holes 18 formed in the drum so that the latter rotates with the wheel. The axle 16 is located in a housing 20 which is mounted on a spring or frame 21 of the vehicle. A brake flange plate 22 is mounted on the housing 20 adjacent the disc 15 and has the usual brake shoe 23 and lining 24.

A rheostat assembly 25 mounted in the rim 11 as shown in Figure 1, is illustrated in detail in Figure 2. This asembly includes a substantially cylindrical housing 26 having a relatively large flange 27 adjacent the top thereof which is secured to the inner surface of the rim 11 by screws 28. The flange 27 is separated from the rim by an insulating washer 30 while the screws 28 are separated from said flange by insulating washers 31. The outer end of the housing 26 projects through an opening 32 formed in the rim 11, said opening being larger than the housing so that they do not touch each other.

A plunger 33 protrudes outwardly through the top of the housing 26 and has an outwardly extending flange 34 on its inner end adapted when in its outermost position to engage a projection 35 formed on the inner surface of the housing at a point spaced inwardly from the outer end thereof. Another projection 36 is formed on the inner surface of the housing at the top thereof, thus forming a space 37 between itself and the projection 35 in which a suitable lubricant, such as graphite, may be packed.

A cap 38 is removably mounted on the top of the plunger 33 and a dust cap 40 formed of light rubber, fits over the cap 38 and the plunger and is secured to the latter within the opening 32 of the rim, 11, by means of a ring 41.

A stud 42 is threaded through the bottom 43 of the housing 26 and has a relatively large flange 44 on its inner end. A coil spring 45 is seated on the flange 44 and presses against the inner surface of the cap 38 to urge the plunger 33 towards its outermost position. The tension of the spring 45 may be adjusted by turning the stud 42.

An arm 46 projects outwardly from the plunger 33 at the bottom thereof through a vertical slot 47 formed in the housing 26 adjacent the inner end thereof, into a casing 48 formed with or mounted on the housing on one side thereof inside the rim 11. This arm has a reduced section 50, on the outer end of which is slidably mounted a contact plunger 51, said plunger being urged outwardly by a spring 52 lying between its inner end and the larger section of the arm.

A resistance coil assembly 53 is mounted in the casing 48 on its outer side wall. This resistance coil assembly, see Figure 5, consists of a fibre base 54 which converges or tapers evenly towards the top thereof or in a series of steps 55, as shown. A resistance coil 56 of very fine wire is wound around the base 54. This coil is small at the top of the base and gradually grows larger towards the bottom thereof. A sheet of insulating material 57 covers the back of the base 54 and the convolutions of the coil 56 extending thereover. The upper and lower ends of this coil extend through the base 54 and are connected to strap conductors 58 and 60, respectively. The straps extend outwardly from the side of the fibre base and then are bent at right angles thereto, as shown in Figure 5.

A layer of insulating material 61 extends around the inner surface of the casing 48, see Figure 3, and the assembly 53 is placed in said casing against the insulating layer so that the straps 58 and 60 are insulated from the casing. Screws 62 and 63 extend through the straps 58 and 60, respectively, and through the casing 48, from which they are insulated by insulating washers 64.

The screw 62 is grounded to one of the screws 28 by an insulated wire 65 while an insulated wire 66 is connected to the screw 63 outside the casing 48 and an insulated wire 67 is connected to the stud 42 by a nut 68. A very flexible and insulated wire 70 connects the screw 63 inside the casing 48 to a contact 71 mounted on an insulator 72 which is carried by the enlarged section of the arm 46. This contact 71 is adapted to engage a lug contact 73 formed on the strap 58 when the plunger 33 is in its outermost.

Referring back to Figure 1 and to Figure 6, a contact block 74 is mounted in the wheel 10 adjacent the hub thereof by screws 75. This block has bolts 76 and 77 extending therethrough and beyond the faces thereof. Each bolt has a spring 78 extending between its head and the bottom of a recess 80 formed in the block around the bolt, and has nuts 81 thereon at the back of the block. The wires 67 and 66 are connected to the bolts 76 and 77, respectively, by means of the nuts 81.

Spaced and concentric collector rings 82 and 83 are mounted on an insulating ring 84 which is mounted on the inner surface of the wall of the brake drum 17. The rings 82 and 83 are held in position by a plurality of screws 85 and 86, respectively, there being a screw in each ring for each hole 18 of the drum. The screws 85 and 86 are all in the same relationship to each adjacent hole and their heads project beyond the outer surface of the drum. Suitably shaped insulators 87 insulate the screws 85 and 86 from the brake drum. With this arrangement, when the wheel 10 is placed on the bolts 14 and moved against the drum 17, the bolts 76 and 77 always engage one set of screws 85 and 86 owing to the position of the latter in relation to the bolt holes 18. The springs 78 press the bolts against the screws to make firm contact therebetween.

A carbon brush 88 slidably mounted in a holder 90 is urged outwardly therefrom by a spring 91 slidably to engage the collector ring 83. The holder 90 has a base 92 which is mounted on the flange plate 22 by bolts 93 and 94. The base 92 and bolt 94 are insulated from the plate 22 by insulating washers 95 and 96 while the bolt 93 is insulated from the base by an insulating washer 97. An insulated wire 98 is connected to the bolt 94 by nuts 100.

Another brush holder 101 is mounted on from the plate 22 by bolts 102 and 103 and is insulated therefrom in the same manner as the holder 90. This holder has a spring loaded carbon brush 104 which slidably engages the collector ring 82. An insulated wire 105 is connected to the bolt 102 by nuts 106.

Figure 8 illustrates a panel 107 having four direct current volt meters 108 mounted thereon, one for each wheel of the vehicle. This panel is located at any convenient point in the vehicle adjacent the operator's seat. Each volt meter has a pointer 110 and a scale 111, the latter being evenly spaced to indicate pressure in pounds. The scale may have any desired range but for ordinary automobiles it preferably ranges from 10 to 40 pounds, a practical range for such vehicles. For trucks and heavy duty vehicles the range may be higher.

The wire 105 from the bolt 102 is connected to one side of a meter 108 while said meter is grounded by a wire 112. The wire 98 is connected to a buzzer or other audible signal device 113, see Figure 9, which is connected by a wire 114 to one side of the ignition switch 115 of the vehicle. The switch 115 is connected by wire 116 to the battery 117 of the vehicle which, in turn, is grounded by a strap 118 in the usual manner.

It is preferable to ground the axle 16 in any suitable manner. This may be done by a collector ring 120 mounted on the disc 15 and which is slidably engaged by a spring loaded brush 121 projecting outwardly from a brush holder 122 which is mounted on the flange plate 22 by a screw or bolt 123.

In operation, the plunger 33 is pressed into its housing 26 by the tube 13. When the pressure of the tire is right, the plunger is pressed almost to its innermost position. As the plunger moves in and out, the contact plunger 51 rides up and down the resistance coil 56. The wire of this coil is very fine and the coil grows larger towards the bottom in order that the least movement of the plunger is registered on its meter. This taper of the coil is necessary since the movement of the plunger per pound is relatively great at the lower pressures while it becomes less as the pressure in the tire increases. Furthermore, the pressure of the spring 45 increases as the plunger moves inwardly.

The cap 40 prevents dust from getting down into the resistance coil assembly 53.

The contact plunger 51 is connected through the arm 46, plunger 33, spring 45, and the stud 42 to the wire 67. By referring to Figures 1 and 9 it will be seen that a circuit is completed by the wire 67, bolt 76, screw 85, collector ring 82, brush 104, bolt 102, wire 105, meter 108, and wire 112 to the ground. One end of the resistance coil 56 is grounded by the wire 65. Another circuit consists of the coil 56, wire 66, bolt 77, screw 86, brush 88, bolt 94, wire 98, buzzer 113, wire 114, ignition switch 115, wire 116, battery 117, and the ground strap 118.

As the pressure in the tire increases, the plunger 51 moves down the coil 56 and the correct pressure is indicated on the meter 108. The current flows from the battery through the coil 56 only when the ignition switch 115 is closed. The resistance of the coil is such that ordinarily there is not sufficient current to operate the buzzer 113. When the pressure of the tire drops below a predetermined point, the contact 71 on the arm 46 engages the lug 73 to ground the circuit including the buzzer so that the latter is set into operation. If desired, another switch may be inserted in the circuit between the switch 115 and the buzzer so that it may be turned off once the signal is given. Furthermore, another lug 73 may be arranged so as to be engaged by the contact 71 when the tire pressure rises above a predetermined point.

There is a rheostat assembly 25 for each wheel of the vehicle so that there is a wire 98 from the buzzer to each assembly.

Any discrepancy in the pressure readings may be adjusted by turning the stud 42 to increase or decrease the tension on the spring 45 until the pressure reading is correct.

By having a meter 108 for each tire, the operator of the vehicle always knows the condition of his tires. If a tire starts to lose pressure, he can see the rate of loss and by that can tell whether it is dangerous or not or whether he can reach a service station or garage before the tire is too flat for driving. If the pressure of a tire drops below a danger point, the buzzer immediately notifies the operator. This invention is particularly useful for aeroplanes since a pilot ordinarily cannot tell whether a tire is soft or flat until he lands.

Various modifications may be made in this invention without departing from the spirit thereof or the scope of the claims, and therefore, the exact forms shown are to be taken as illustrative only and not in a limiting sense, and it is desired that only such limitations shall be placed thereon as are disclosed in the prior art or are set forth in the accompanying claims.

What I claim as my invention is:

1. In tire gauge apparatus adapted to be mounted on the rim of a vehicle wheel to register on a meter within the vehicle the pressure of a pneumatic tire on said wheel, a housing mounted on the rim, a plunger mounted in the housing and projecting beyond the outer end thereof into the tire, spring means in the housing urging the plunger outwardly therefrom, said plunger being depressed against the pressure of the spring by the tube of the tire as the latter is inflated, a flange on the inner end of the plunger, a projection on the inner surface of the housing spaced below the outer end thereof, said projection being engaged by the plunger flange to limit the outward movement of the plunger, another projection on the inner surface of the housing at the top thereof forming a space between itself and the first projection in which a solid lubricant may be packed against the plunger, a resistance coil located in a casing adjacent the plunger, an arm projecting outwardly from the plunger into the casing, and a contact on said arm adapted to engage and to be moved up and down the coil by the plunger.

2. In tire gauge apparatus adapted to be mounted on the rim of a vehicle wheel to register on a meter within the vehicle the pressure of a pneumatic tire on said wheel, a housing mounted on the rim, a plunger mounted in the housing and projecting beyond the outer end thereof into the tire, spring means in the housing urging the plunger outwardly therefrom, said plunger being depressed against the pressure of the spring by the tube of the tire as the latter is inflated, a flange on the inner end of the plunger, a projection of the inner surface of the housing adjacent the outer end thereof, said projection being engaged by the plunger flange to limit the outward movement of the plunger, a light dust cap fitting over the plunger and anchored to the housing adjacent the rim, a resistance coil located in a casing adjacent the plunger, an arm projecting outwardly from the plunger into the casing, and a contact on said arm adapted to engage and to be moved up and down the coil by the plunger.

3. In tire gauge apparatus adapted to be mounted on the rim of a vehicle wheel to register on a meter within the vehicle the pressure of a pneumatic tire on said wheel, a housing mounted on the rim, a plunger mounted in the housing and projecting beyond the outer end thereof into the tire, spring means in the housing urging the plunger outwardly therefrom, said plunger being depressed against the pressure of the spring by the tube of the tire as the latter is inflated, a stud threaded in the bottom of the housing and projecting outwardly therefrom, a flange on the inner end of the stud upon which the spring rests, the tension of said spring being adjusted by turning the stud, a resistance coil located in a casing adjacent the plunger, an arm projecting outwardly from the plunger into the casing, and a contact on said arm adapted to engage and to be moved up and down the coil by the plunger.

4. In tire gauge apparatus adapted to be mounted on the rim of a vehicle wheel to register on a meter within the vehicle the pressure of a pneumatic tire on said wheel, a housing mounted on the rim, a plunger mounted in the housing and projecting beyond the outer end thereof into the tire, spring means in the housing urging the plunger outwardly therefrom, said plunger being depressed against the pressure of the spring by the tube of the tire as the latter is inflated, means for adjusting the tension of the spring, a flange on the inner end of the plunger, a projection on the inner surface of the housing spaced below the outer end thereof, said projection being engaged by the plunger flange to limit the outward movement of the plunger, another projection on the inner surface of the housing at the top thereof forming a space between itself and the first projection in which a solid lubricant may be packed against the plunger, a resistance coil located in a casing adjacent the plunger, an arm projecting outwardly from the plunger into the casing, and a contact on said arm adapted to engage and to be moved up and down the coil by the plunger.

5. In tire gauge apparatus adapted to be mounted on the rim of a vehicle wheel to register on a meter within the vehicle the pressure of a pneumatic tire on said wheel, a housing mounted on the rim, a plunger mounted in the housing and projecting beyond the outer end thereof into the tire, spring means in the housing urging the plunger outwardly therefrom, said plunger being depressed against the pressure of the spring by the tube of the tire as the latter is inflated, a stud threaded in the bottom of the housing and projecting outwardly therefrom, a flange on the inner end of the stud upon which the spring rests, the tension of said spring being adjusted by turning the stud, a flange on the inner end of the plunger, a projection on the inner surface of the housing adjacent the outer end thereof, said projection being engaged by the plunger flange to limit the outward movement of the plunger, a light dust cap fitting over the plunger and anchored to the housing adjacent the rim, a resistance coil located in a casing adjacent the plunger, an arm projecting outwardly from the plunger into the casing, and a contact on said arm adapted to engage and to be moved up and down the coil by the plunger.

6. In tire gauge apparatus adapted to be mounted on the rim of a vehicle wheel to register on a meter within the vehicle the pressure of a pneumatic tire on said wheel, a housing mounted on the rim, a plunger mounted in the housing and projecting beyond the outer end thereof into the tire, spring means in the housing urging the plunger outwardly therefrom, said plunger being depressed against the pressure of the spring by the tube of the tire as the latter is inflated, a stud threaded in the bottom of the housing and projecting outwardly therefrom, a flange on the inner end of the stud upon which the spring rests, the tension of said spring being adjusted by turning the stud, a flange on the inner end of the plunger, a projection on the inner surface of the housing adjacent the outer end thereof, said projection being engaged by the plunger flange to limit the outward movement of the plunger, a light dust cap fitting over the plunger and anchored to the housing adjacent the rim, a resistance coil of fine wire diverging from its top towards the bottom thereof, said coil being located in a casing adjacent the plunger, an arm projecting outwardly from the plunger into the casing, and a resilient contact on said arm adapted to engage and to be moved up and down the coil by the plunger.

WILLIAM HOLINATY.